United States Patent [19]

Peroni

[11] Patent Number: 5,362,186
[45] Date of Patent: *Nov. 8, 1994

[54] SINGLE POST STUD WITH LOCKING BLADE

[75] Inventor: Peter A. Peroni, Pottstown, Pa.

[73] Assignee: LaFrance Corporation, Philadelphia, Pa.

[*] Notice: The portion of the term of this patent subsequent to Aug. 10, 2010 has been disclaimed.

[21] Appl. No.: 104,321

[22] Filed: Aug. 9, 1993

Related U.S. Application Data

[63] Continuation-in-part of Ser. No. 882,671, May 14, 1992, Pat. No. 5,233,870.

[51] Int. Cl.$^5$ ............................................. F16B 19/08
[52] U.S. Cl. ..................................... 411/508; 411/913
[58] Field of Search ............... 411/508, 509, 510, 908, 411/913; 73/296

[56] References Cited

U.S. PATENT DOCUMENTS

| | | | |
|---|---|---|---|
| D. 293,880 | 1/1988 | Takahashi | 411/913 |
| 2,956,605 | 10/1960 | Rapata | 411/913 |
| 3,009,381 | 11/1961 | Rapata | 411/508 |
| 3,093,874 | 6/1963 | Rapata | 411/508 |
| 3,119,299 | 1/1964 | Sarafinas | 411/508 |
| 3,908,235 | 9/1975 | Telliard et al. | 411/913 |
| 4,524,617 | 6/1985 | Krehel et al. | 73/296 |
| 4,534,088 | 8/1985 | Ricke | 411/508 |
| 4,708,895 | 11/1987 | Mizusawa | 411/509 |
| 4,762,437 | 8/1988 | Mitomi | 411/510 |
| 4,898,493 | 2/1990 | Blankenburg | 411/508 |
| 4,973,212 | 11/1990 | Jacobs | 411/908 |
| 5,233,870 | 8/1993 | Peroni | 411/913 |

FOREIGN PATENT DOCUMENTS

| | | | |
|---|---|---|---|
| 520169 | 4/1940 | United Kingdom | 411/510 |
| 1234965 | 6/1971 | United Kingdom | 411/508 |

*Primary Examiner*—William A. Cuchlinski, Jr.
*Assistant Examiner*—G. Bradley Bennett
*Attorney, Agent, or Firm*—Connolly & Hutz

[57] ABSTRACT

A locking assembly for securement through a hole in a support member comprises an abutment member having a locking stud in the form of a post with a locking blade. A plane perpendicular to the abutment member bisects the post. The locking blade is disposed on one side and spaced from the bisecting plane. The stud is completely open in the space opposite the locking blade to create an air space over the entire volume of the stud outwardly of the post and inwardly of the single locking blade. The locking blade includes an outwardly disposed inclined surface which terminates in a crest edge. The outwardly disposed inclined surface functions as a wedge for being disposed against an edge of the hole in a support member. An inwardly disposed inclined surface extends from the crest edge. The blade is deflectable at the inwardly disposed inclined surface so that the inwardly disposed inclined surface functions as a cam which guides the blade into the hole. An indexing member is secured to the abutment member on the same side of the abutment member as the locking stud and secures the abutment member to the support member at a location remote from the post.

20 Claims, 3 Drawing Sheets

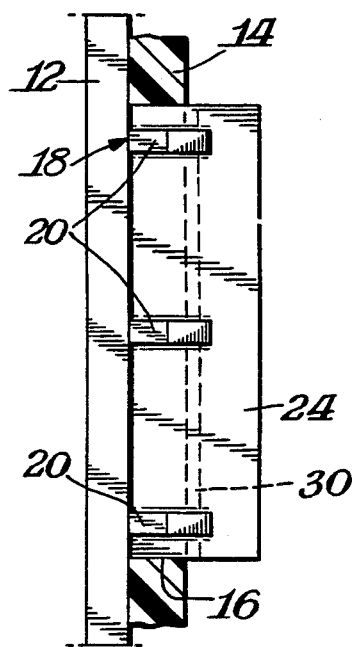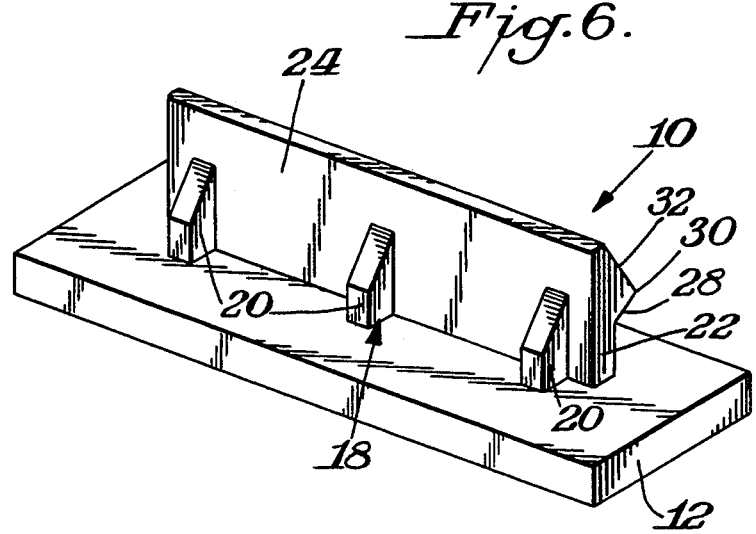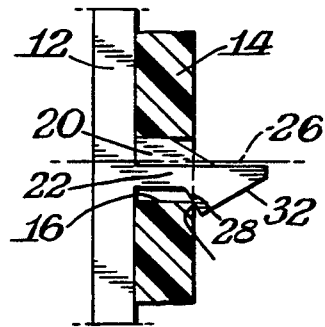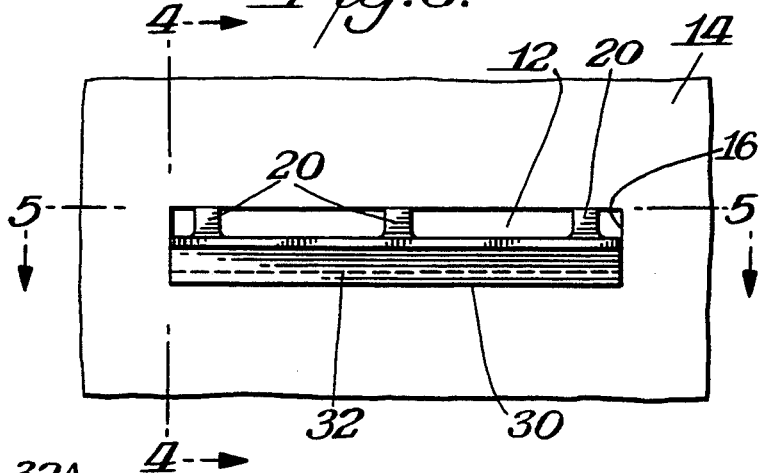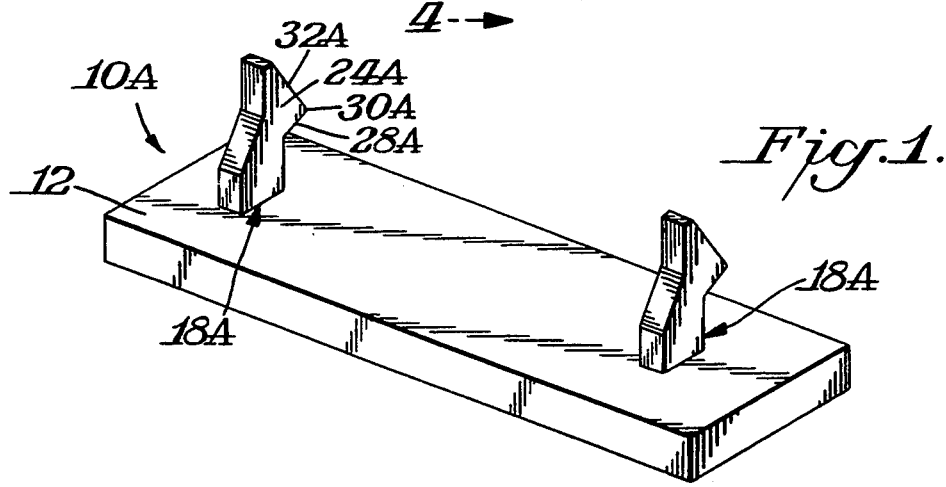

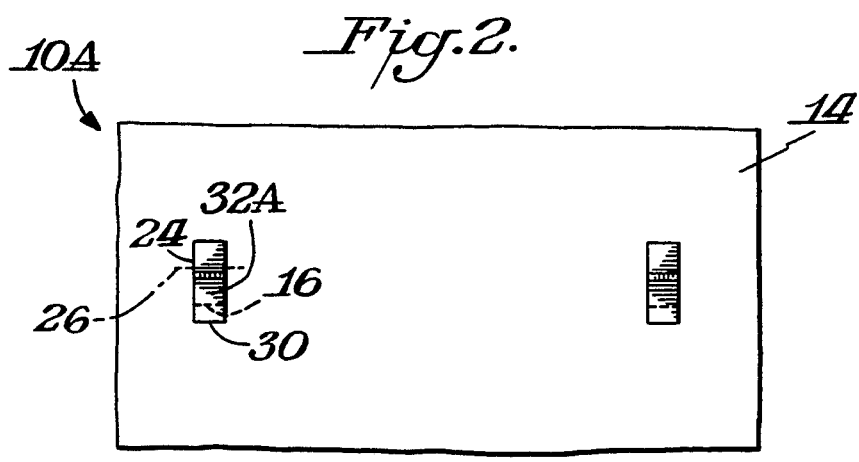
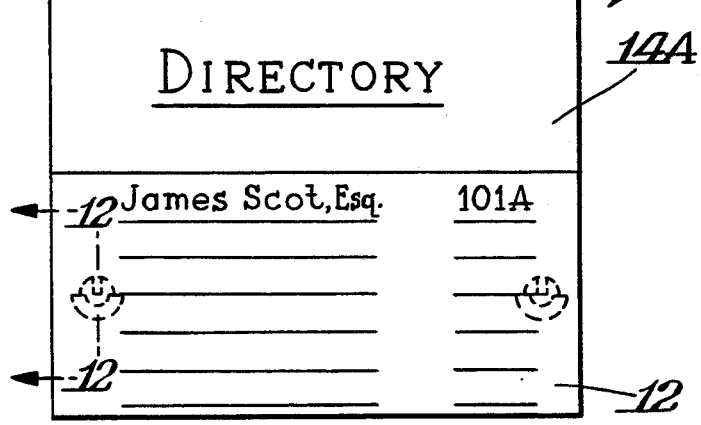
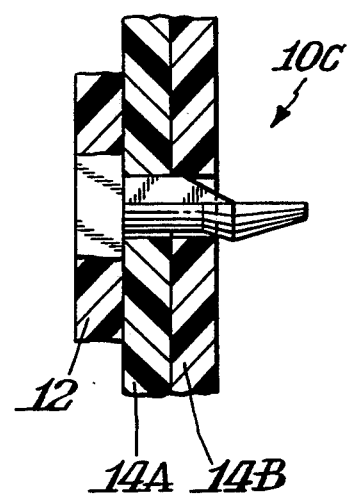

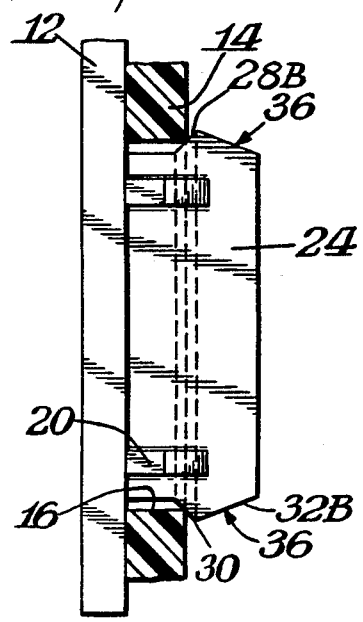
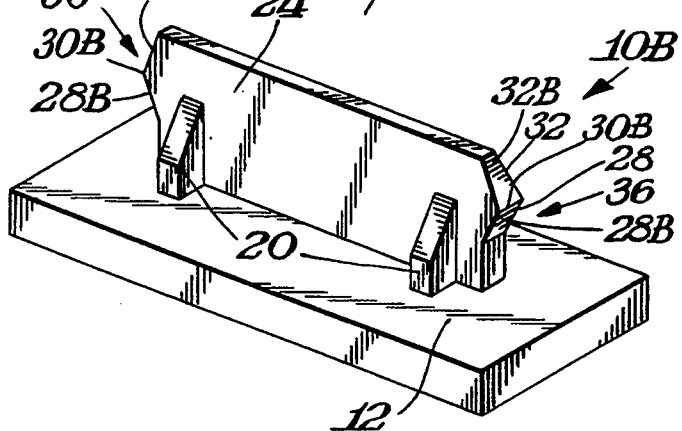
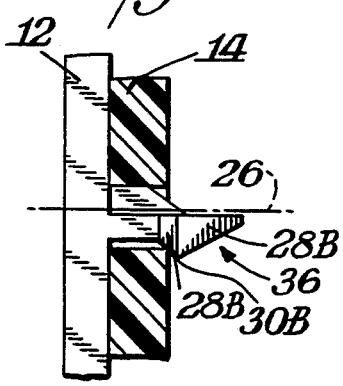
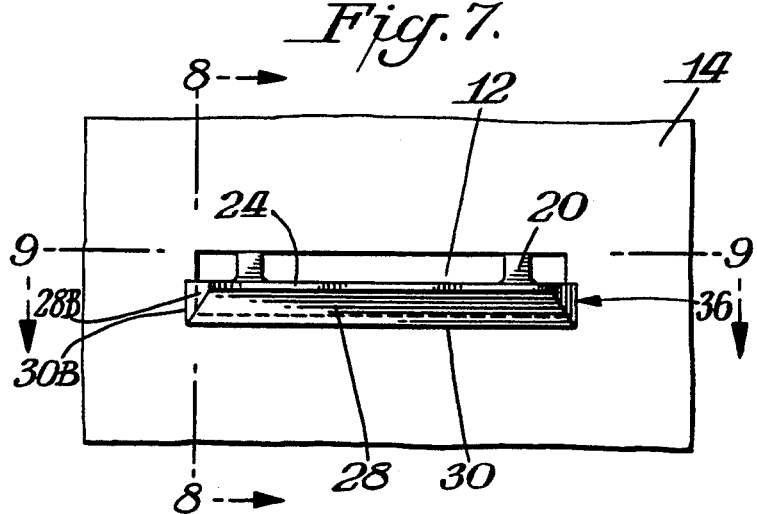

5,362,186

SINGLE POST STUD WITH LOCKING BLADE

CROSS-REFERENCE TO RELATED APPLICATION

This application is a continuation-in-part of U.S. patent application Ser. No. 07/882,671 filed May 14, 1992, now U.S. Pat. No. 5,233,870.

BACKGROUND OF THE INVENTION

There are various applications where it is necessary to mount a member such as a plate to another member. For example, propane tank holders are provided with plates to indicate the level of propane in the tank. Generally, such plates are mounted to the tank holder by a locking stud arrangement. A conventional form for each such locking stud is to provide a post having an axial slot thereby creating a pair of side by side spaced blades of split pin form. In practice it is necessary to accurately position the blade for fitting into the propane tank holder which functions as a support member for the plate. Where the plate includes a plurality of such studs, extreme care must be taken to be sure that all of the studs are properly aligned with corresponding holes. Even where there is proper insertion, however, such arrangements are not completely effective because the material can cold flow after insertion which would decrease the effectiveness of its holding ability even to the point of ceasing to hold the plate in place.

A further disadvantage with the conventional slip pin type locking stud is the difficulty in tooling with respect to the problems of collapsing the core.

Parent U.S. patent application Ser. No. 07/882,671 now U.S. Pat. No. 5,233,870 discloses various techniques for overcoming the above disadvantages.

SUMMARY OF THE INVENTION

An object of this invention is to provide a locking stud arrangement of the type disclosed in parent patent application Ser. No. 07/882,671.

A further object of this invention is to provide such a locking stud arrangement which could be used in non-circular holes of elongated shape such as rectangular holes or slots.

In accordance with this invention a locking stud assembly includes an abutment member having a post form connected to and disposed outwardly from the abutment member. A single locking blade is connected to and disposed outwardly of the post. The locking blade is disposed on one side of and spaced from the plane which bisects the post. As a result, the stud is completely open in the space opposite the locking blade to create an air space over the entire volume of the stud outwardly of the post and inwardly of the single locking blade. The locking blade includes an outwardly disposed inclined surface terminating in a crest edge which functions as wedge lock means. An inwardly disposed inclined surface extends from the crest edge to function as a cam for the deflectable blade.

An indexing member may be secured to the abutment member on the same side of the abutment member as the locking stud and thus secures the abutment member to the support member at a location from the locking stud. In a preferred practice of the invention the indexing member is also a locking stud of the same construction as the first locking stud. Both locking studs may include spaced post portions extending from the abutment member and interconnected by a plate which functions as a unitary blade for both post portions. The plate includes the outwardly and inwardly disposed inclined surfaces. Any number of post portions could be used in accordance with the length of the plate which in turn would correspond to the length of an elongated hole through which the locking assembly is inserted.

The locking stud preferably has flat surfaces with the post being of rectangular cross-section.

The locking assembly may be used for securing a plurality of members together.

THE DRAWINGS

FIG. 1 is a perspective view of a locking assembly in accordance with this invention;

FIG. 2 is a rear elevational view of the locking assembly shown in FIG. 1;

FIG. 3 is a rear elevational view of a modified form of locking assembly in accordance with this invention;

FIGS. 4 and 5 are cross-sectional views taken through FIG. 3 along the lines 4—4 and 5—5, respectively;

FIG. 6 is a perspective view of the locking assembly shown in FIGS. 3–5;

FIG. 7 is a rear elevational view of yet another form of locking assembly in accordance with this invention;

FIGS. 8–9 are cross-sectional views taken through FIG. 7 along the lines 8—8 and 9—9, respectively;

FIG. 10 is a perspective view of the locking assembly shown in FIGS. 7–9;

FIG. 11 is a front elevational view of a locking assembly in accordance with this invention for securing a plurality of support members together; and FIG. 12 is a cross-sectional view taken through FIG. 11 along the line 12—12.

DETAILED DESCRIPTION

The present invention is directed to variations of the locking assembly disclosed in parent U.S. patent application Ser. No. 07/882,671 the details of which are incorporated herein by reference thereto. Accordingly, the present application will refer to the details of the parent application solely as is necessary for an understanding of such variation.

As disclosed in the parent application the single post stud with a locking blade is of generally arcuate form wherein the post is cylindrical and has a circular cross-section and the wedge and cam portions are arcuate surfaces. The locking assembly of the parent application is particularly effective for use with correspondingly shaped circular holes. The present application relates to variations wherein it is not necessary to utilize circular or arcuate surfaces and wherein the locking assembly may be used for insertion through non-circular holes.

FIGS. 1–2 illustrate a variation wherein the locking assembly 10A includes spaced locking studs which are completely separate from each other and are formed more along the lines of the locking assembly disclosed in parent U.S. patent application Ser. No. 07/882,671 except that flat surfaces are used instead of arcuate surfaces. Thus locking assembly 10A includes abutment member or carrier 12 having a single post 18A with a locking blade 24A connected to and disposed outwardly from the post. The locking blade has a outwardly inclined surface 28A which terminates in a crest 30A and then includes an inwardly inclined surface 32A.

In the locking assembly 10A of FIGS. 1-2 the post 18A is bisected by a plane 26 (FIG. 2) which extends perpendicular to abutment member 12. Blade 24A is entirely on one side of and spaced from plane 26 to function in the manner of the locking studs of parent U.S. patent application Ser. No. 07/882,671.

Although post 18A is preferably of rectangular cross section other shapes, such as a square or ellipse may be used. Similarly, although the various surfaces are illustrated as being flat, there may be rounded edges or curved/arcuate surfaces. What is important is that the blade is located entirely on one side of the axial centerline or bisecting plane and that the blade is deflectable with an outwardly inclined wedge surface and an inwardly inclined cam surface.

FIGS. 1-2 illustrate two spaced locking studs. One locking stud would function as an indexing member for the other. As in the parent application more than two spaced locking studs may be used. Alternatively, the invention may be practiced with only one locking stud. Since the non-cylindrical locking studs would be used with an elongated slot rather than a circular hole, an indexing member is not absolutely necessary.

FIGS. 3-6 illustrate a locking assembly 10 in accordance with a further embodiment of this invention. As shown therein locking assembly 10 includes an abutment member or carrier 12 which may be a nameplate or may be of any other construction wherein it is desired to secure the abutment member 12 to a support member 14 by insertion of the locking assembly through a hole 16 in the support member. The locking assembly includes a post 18 connected to and disposed outwardly from the abutment member 12. In the form of the invention shown in FIGS. 3-6 the post 18 includes a base or post portion 20 and an extension 22 of the blade 24. In the form illustrated in FIGS. 3-6 a plurality of base portions 20 are provided spaced from each other while the blade extension 22 is part of a plate member 24 interconnected to all of the base portions 20. The plate 24 thus functions as an integral locking blade which is disposed on one side of the plane 26 bisecting the post 18 as clearly shown in FIG. 4 wherein all of the blade extension 22 is on one side of plane 26 while part of the base portion 20 extends beyond plane 26.

As shown in FIG. 4 plane 26 is perpendicular to member 12 and extends at the axial center line of the combined post 18. Thus, as also shown in FIG. 4 the stud is completely open in the space opposite the locking blade 24 creating an air space over the entire volume of the stud outwardly of the post and inwardly of the single locking blade 24.

As illustrated the locking blade 24 includes an outwardly disposed inclined surface 28 which terminates in a crest edge 30. The outwardly disposed inclined surface 28 comprises a wedge lock for being disposed against an edge of the hole 16 in the support member 14 as best shown in FIG. 4.

An inwardly disposed inclined surface 32 extends from the crest edge 30. Blade 24 is deflectable at the inwardly disposed inclined surface. Accordingly, the inwardly disposed inclined surface 32 comprises cam means whereby insertion of the blade 24 into the hole 16 causes an edge 34 of the hole 16 to press against the cam means or inwardly inclined surface 32 and deflect the blade 24 until the crest edge 30 has passed beyond the hole with the wedge lock means or outwardly inclined surface 28 preventing removal of the stud from the hole.

In the illustrated practice of the invention an indexing member is secured to the abutment member 12 on the same side of the abutment member as the locking stud. The indexing member thus secures the abutment member to the support member at a location remote from the locking stud.

In the embodiment shown in FIGS. 3-6 where a plurality of post portions or base portions are used interconnected by a single blade 24 each of the base portions 20 may be considered as an indexing member for the other base portions. Alteratively, the abutment member 12 may include a separate post or projection or other form of indexing member remote from and having no connection to the posts 18 and blade 24.

The base portion of post 18 with its associated segment of the blade 24 may be considered similar to a single locking stud as in FIGS. 1-2, except that the same blade is used to interconnect the spaced posts 18.

The present invention is particularly useful where an elongated hole or slot 16 is in support member 14 and provides extreme holding force. A plurality of such arrangements may be provided on a single abutment member where there are a plurality of elongated holes. The number of locking studs would correspond to the number of holes. The size and arrangement of locking studs would correspond to the size and arrangement of holes. Thus, it is possible to use a locking stud having any number of two or more base portions 20 interconnected by a single blade 24 in accordance with the size and shape of the hole 16. Where the support member includes holes of different size and shape, the abutment member 12 may have locking studs of differing numbers of base portions such as a two base portion arrangement at one location and a three base portion at another location and a single base portion at a third location and so forth.

FIGS. 7-10 illustrate a further variation of locking assembly 10B. Locking assembly 10B is illustrated as having two post portions 20, 20. Any number of post portions could be used. In general locking assembly 10B is similar to locking assembly 10 of FIGS. 3-6. Locking assembly 10B differs in that one or both ends of blade 24 terminates in an auxiliary locking structure 36 comprising an outwardly inclined wedge surface 28B with a crest 30B and an inwardly inclined cam surface 32B.

Such auxiliary locking structure 36 would be desired for certain slot shapes. The auxiliary locking structure could be used in addition to or in place of the surfaces 28, 32 on the long side wall of blade 24. As illustrated auxiliary locking structure 36 is disposed on one side of and spaced from bisecting plane 26.

Advantageously, the locking assembly of this invention may be utilized for mounting an abutment member to a support member of any suitable thickness or wherein a plurality of support members are used. FIGS. 11-12, for example, illustrate how a locking assembly might be used to connect member 12 to two support members 14A and 14B. Such an arrangement might be desirable, for example, where one of the support members, such as support member 14B, is a permanent surface, such as a wall. The other support member 14A might be a directory wherein certain information is of a generally permanent nature. It might be desired, however, to periodically change some of the information on the directory. This could be done by utilizing a carrier 12 having the more frequently changed information thereon. Thus, the carrier 12 would be superimposed over support member 14A and would be used for securing the carrier 12 and the support member 14A to the other support member 14B.

The various arrangements described herein with respect to FIGS. 1-2, 3-6 and 7-10 may be utilized for connecting the abutment member 12 to a pair of support members. FIGS. 11-12 also illustrate how the same concept could be utilized wherein the locking assembly 10C is of the type described in parent U.S. patent application Ser. No. 07/882,671 (now U.S. pat. No. 5,233,370) having a arcuate surfaces and cylindrical post.

What is claimed is:

1. A locking assembly for securement through a hole in a support member comprising an abutment member, a locking stud having a post connected to and disposed outwardly from said abutment member, a plane perpendicular to said abutment member and bisecting said post, a single locking blade connected to and disposed outwardly from said post, said locking blade being disposed on one side of and spaced from said bisecting plane, said stud being completely open in the space opposite said locking blade creating an air space over the entire volume of said stud outwardly of said post and inwardly of said single locking blade, said locking blade including an outwardly disposed inclined surface terminating in a crest edge, said outwardly disposed inclined surface comprising wedge lock means for being disposed against an edge of the hole in the support member, an inwardly disposed inclined surface extending from said crest edge, said blade being deflectable at said inwardly disposed inclined surface, said inwardly disposed inclined surface comprising cam means whereby insertion of said blade into the hole causes an edge of the hole to press against said cam means and deflect said blade until said crest edge has passed beyond the hole with said wedge lock means preventing removal of said stud from the hole, and including an indexing member secured to said abutment member on the same side of said abutment member as said locking stud securing said abutment member to the support member at a location remote from said locking stud.

2. The locking assembly of claim 1 wherein said indexing member comprises a second locking stud.

3. The locking assembly of claim 2 wherein said locking studs are separate and spaced from each other.

4. The locking assembly of claim 2 wherein said locking studs are interconnected by a plate, and said plate comprising a common blade for said locking studs.

5. The locking assembly of claim 4 wherein said plate has an extension connected to said abutment member, said post of each of said locking studs including a base portion connected to said abutment member and including said extension, said base portion extending on both sides of said bisecting plane and said extension being completely on one side of and spaced from said bisecting plane.

6. The locking assembly of claim 5 wherein there are at least three of said base portions interconnected by a single blade.

7. The locking assembly of claim 5 wherein each of said outwardly disposed inclined surface and said inwardly disposed inclined surface is flat.

8. The locking assembly of claim 1 wherein each of said outwardly disposed inclined surface and said inwardly disposed inclined surface is flat.

9. The locking assembly of claim 1 wherein said post is rectangularly shaped.

10. The locking assembly of claim 1 wherein said inclined surfaces are on the longitudinal wall of said blade.

11. The locking assembly of claim 10 including auxiliary locking structure on at least one edge of said blade, and said auxiliary locking structure including an outwardly inclined surface wedge lock means and an inwardly inclined surface cam means.

12. The locking assembly of claim 1 wherein said inclined surfaces are on at least one of the edges of said blade.

13. The locking assembly of claim 1 in combination with a support member having said hole in the form of an elongated slot.

14. The locking assembly of claim 1 in combination with a plurality of support members having aligned holes, and said locking stud extending through said aligned holes.

15. A locking assembly for securement through a non-circular hole in a support member comprising an abutment member, a locking stud having a non-cylindrical post of non-circular cross-section connected to and disposed outwardly from said abutment member, a plane perpendicular to said abutment member and bisecting said post, a single locking blade connected to and disposed outwardly from said post, said locking blade being disposed on one side of and spaced from said bisecting plane, said stud being completely open in the space opposite said locking blade creating an air space over the entire volume of said stud outwardly of said post and inwardly of said single locking blade, said locking blade including an outwardly disposed inclined surface terminating in a crest edge, said outwardly disposed inclined surface comprising wedge lock means for being disposed against an edge of the hole in the support member, an inwardly disposed inclined surface extending from said crest edge, said blade being deflectable at said inwardly disposed inclined surface, and said inwardly disposed inclined surface comprising cam means whereby insertion of said blade into the hole causes an edge of the hole to press against said cam means and deflect said blade until said crest edge has passed beyond the hole with said wedge lock means preventing removal of said stud from the hole.

16. The locking assembly of claim 15 wherein said inclined surfaces are flat.

17. The locking assembly of claim 16 wherein said post is of rectangular cross-section.

18. The locking assembly of claim 17 in combination with a support member having said hole in the form of an elongated slot.

19. The locking assembly of claim 15 in combination with a support member having said hole in the form of an elongated slot.

20. The locking assembly of claim 15 in combination with a plurality of support members having aligned holes, and said locking stud extending through said aligned holes.

* * * * *